United States Patent [19]

Su

[11] Patent Number: 4,782,984

[45] Date of Patent: Nov. 8, 1988

[54] POURING DEVICE WITH QUANTITATIVE CHAMBER FOR POWDERY OR GRANULAR MATERIALS

[76] Inventor: Peter T. Su, 15 Valley Forge, Houston, Tex. 77024

[21] Appl. No.: 107,096

[22] Filed: Oct. 13, 1987

[51] Int. Cl.[4] .................. G01F 11/26; G01F 11/28
[52] U.S. Cl. .................. 222/456; 222/454; 222/455; 222/457
[58] Field of Search ............... 222/454, 455, 456, 457, 222/547, 564, 355, 500, 221, 71, 437, 477; 220/334; 229/125.08

[56] References Cited

U.S. PATENT DOCUMENTS

| | | | |
|---|---|---|---|
| 352,195 | 11/1886 | Krag | 222/147 X |
| 1,931,270 | 10/1933 | Rice | 221/98 |
| 2,023,537 | 12/1935 | Myers | 221/98 |
| 2,092,983 | 9/1937 | Milward | 221/98 |
| 2,127,417 | 8/1938 | Nelsen | 221/98 |
| 2,350,925 | 6/1944 | Ramsden et al. | 222/456 |
| 2,771,227 | 11/1956 | Urbina | 222/455 |
| 2,799,436 | 7/1957 | Bernhardt | 222/454 X |
| 2,801,033 | 7/1957 | Silver | 222/455 |
| 2,898,013 | 8/1959 | Herbert | 222/455 |
| 3,202,327 | 8/1965 | Haynie, Jr. | 222/455 |
| 3,484,025 | 12/1969 | Capalia | 222/456 |
| 3,698,606 | 10/1972 | Wakamatsu | 222/457 X |
| 3,954,203 | 5/1976 | Jorgenson | 220/334 |
| 4,667,857 | 5/1987 | Song | 222/454 |

Primary Examiner—Joseph J. Rolla
Assistant Examiner—Lisa C. Waag
Attorney, Agent, or Firm—Marsteller & Associates

[57] ABSTRACT

This invention teaches a dispensing container (10) whereby a predetermined quantity of powdery or granular materials can be dispensed for each pouring operation. Such container is partitioned into one volume control chamber (27) and one storage chamber (28) by a guard panel (50). Upon tilting of the container, material flows out through a metered dispensing outlet (30) until a swinging control panel (40), induced by gravity, moves downward to completely block any further outflow. The quantity to be dispensed can be changed by adjusting the opening sizes of the outlet. An additional free-flow outlet (35) provides the user an option to use this container either as a measured pourer or as a free pourer.

14 Claims, 11 Drawing Sheets

POURING DEVICE WITH QUANTITATIVE CHAMBER FOR POWDERY OR GRANULAR MATERIALS

BACKGROUND OF THE INVENTION

1. Technical Field

This invention relates to dispensing and measuring devices, and is intended, more particularly, for use in dispensing powdery or granular materials such as soap powder, sugar, coffee or starch. The object is to provide an apparatus of this character which will be of simple and inexpensive construction and designed to be adjusted to automatically discharge a predetermined quantity of material at each of its complete movements. Further, all of those prior known measuring pourers which have come to my attention are undependable and inaccurate when attempts are made to rapidly and successively dispense material therefrom in controlled quantities.

The present invention discloses a novel and non-obvious device for dispensing precise volumes of material successively while minimizing difficulty in measuring. Different increments of volume can be obtained quickly and easily with minimal adjustment. In addition, successive rapid dispensing of set increments of volume is very dependable.

2. Background Art

The formation of a measuring chamber within a container by a pair of fixed panels in a certain way that a predetermined quantity of granular or powdery materials can be dispensed at each tilting operation of the container was taught in many patents, e.g. U.S. Pat. Nos. Haynie, 3,202,327; Milward, 2,092,983; Wakamatsu, 3,698,606; Nelsen, 2,127,417; Myers, 2,023,537; and Ramsden et al 2,350,925.

An entirely different design was disclosed by Rice, U.S. Pat. No. 1,931,270 and Silver, U.S. Pat. No. 2,801,033. In both of these patents, the measuring chamber is a closed unit by itself and the material flows into it through an opening controlled by a valve or a flap.

The present invention takes a third approach by mounting a pivotal panel which functions like a time switch so as to allow a preselected volume of material to flow out from the container. The use of a pivotally mounted panel in a kettle was disclosed by Jorgenson et al, U.S. Pat. 3,954,203. However, such use is designed for protecting the kettle user rather than fixing the amount of material to be poured out. More importantly, while the pivotal panel in the invention by Jorgenson et al can function independently, it has to coordinate with other elements of the apparatus in order to operate properly in our invention.

All the prior inventions relating to a measuring and dispensing device have at least one of the following drawbacks: (1) the pouring has to be achieved in an awkward and unnatural way, (2) refill is impossible or difficult, (3) the quantity to be poured can not be adjusted, and (4) the device cannot be converted to a free pourer at the user's option. All these shortcomings have been overcome in this invention.

DISCLOSURE OF INVENTION

It is an object of the present invention to provide a combination material storage, measurement, and dispensing system whereby certain set volumetric material amounts within a broad range can be easily obtained.

Another object of the invention is to provide a powder measurement system that is adjustable so that varying volumes can be quickly and easily dispensed by a convenient change in selected volume setting.

Still another object of the present invention is to provide a powder measurement system that will dispense approximately the same amount of powder with each pouring operation even though the pouring operation are successively and rapidly repeated.

A further object of this invention is to provide a measuring system that may be readily and simply adjusted without change of various parts to dispense preselected volumes of powder within a broad range.

A still further object of the present invention is to provide a self-contained portable system of powder storage and measurement that can be used in an everyday uncomplicated fashion, inexpensively and simply manufactured, and easily refilled if necessary.

Yet another object of this invention is to provide a measuring pourer which can, at the option of the user, be used as a free-flow pourer.

These and other objects and advantages are achieved by the devices of the present invention which provides a swinging control panel and adjustable dispensing outlet for dispensing of measured volumes of powder. The present invention includes a storage chamber holding a quantity of powder in lower portion of container, and volume control chamber in upper corner of container, which container is adapted to rest in an upright position on a surface.

A J-shape guard panel is provided between the volume control chamber and storage chamber. The volume control chamber is located at upper corner of the container so that when the container is placed in its tilted dispensing position the volume control chamber is at an lower position with respect to a major portion of the storage chamber. This lower position is for induced dispensing of the measured volume of powder while the container is in its tilted dispensing position.

One strikingly novel and non-obvious feature of this powder volume control chamber is the adjustability of the size of the dispensing outlet and the provision of a swinging control panel. By means of this adjustable dispensing outlet various amounts of powder within a set volume range can be obtained. The metered dispensing outlet is selectively sized at differing increments to control the amount of powder dispensed and to enable repetitive dispensing of accurate amounts. A swinging control panel is provided to control gravity induced dispensing of the powder from the storage chamber when the container is in the tilted dispensing position.

Also, a starting panel is provided to dispensing approximately the same amount of powder with each pouring operation regardless the level of powder in the container.

BRIEF DESCRIPTION OF DRAWINGS

So that the manner in which the above recited features, advantages and objects of the present invention are attained can be understood in detail, more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A–1C illustrates a preferred embodiment of this invention.

FIG. 2 illustrates an alternative embodiment of this invention.

FIG. 3 illustrates another alternative embodiment of this invention.

FIG. 4 illustrates a third alternative embodiment of this invention.

FIG. 5 illustrates a fourth alternative embodiment of this invention.

DESCRIPTION OF THE PREFERRED EMBODIMENTS

In all drawings, identical numbers represent same elements or counterparts in all embodiments.

Figure 1A:
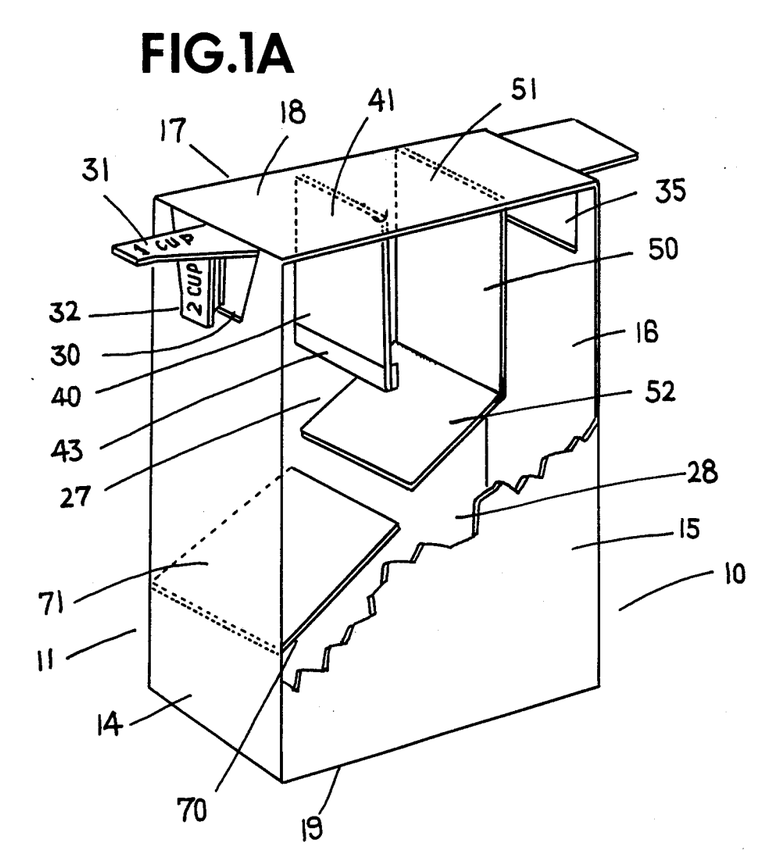
FIG. 1A is a perspective view through the apparatus with the various parts in inoperative positions.

Referring now to the drawings and first to FIG. 1A, a portable powder container representing one embodiment of the invention is illustrated generally at 10. The portable powder container 10 is defined by a housing 11. The housing structure 11 is formed by side walls 14, 15, 16, and 17, a top wall 18, and a bottom wall 19. The J-shape guard panel 50 is attached to the side walls 15 and 17, and top wall 18. The upper portion 51 of guard panel 50 is perpendicular to the top wall 18, while the lower portion 52 is slanted toward the side wall 14. The guard panel 50 divides the housing structure 11 into a volume control chamber 27 and a storage chamber 28.

The adjustable dispensing outlet 30 is located in the upper portion of the side 14 and adjoins the volume control chamber 27. Outlet petals 31 and 32 are for adjusting the opening size of the dispensing outlet 30.

Figure 1B:
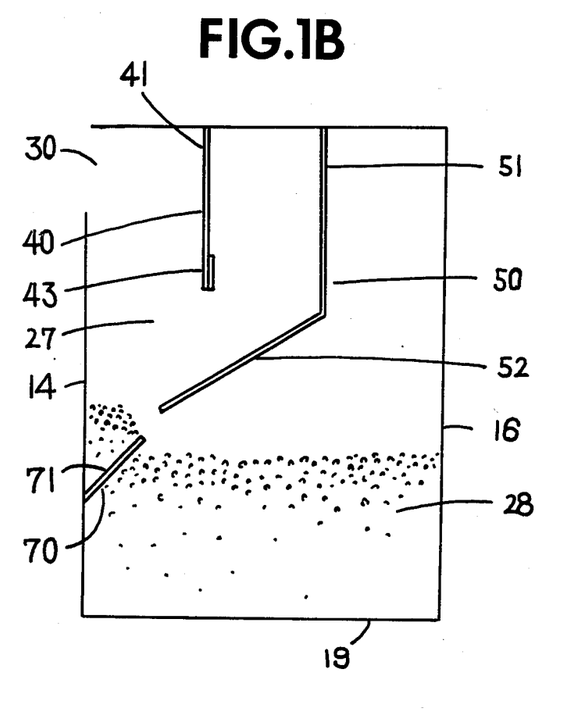
FIG. 1B is a cross-sectional view, the apparatus being shown in the inoperative position.
Figure 1C:
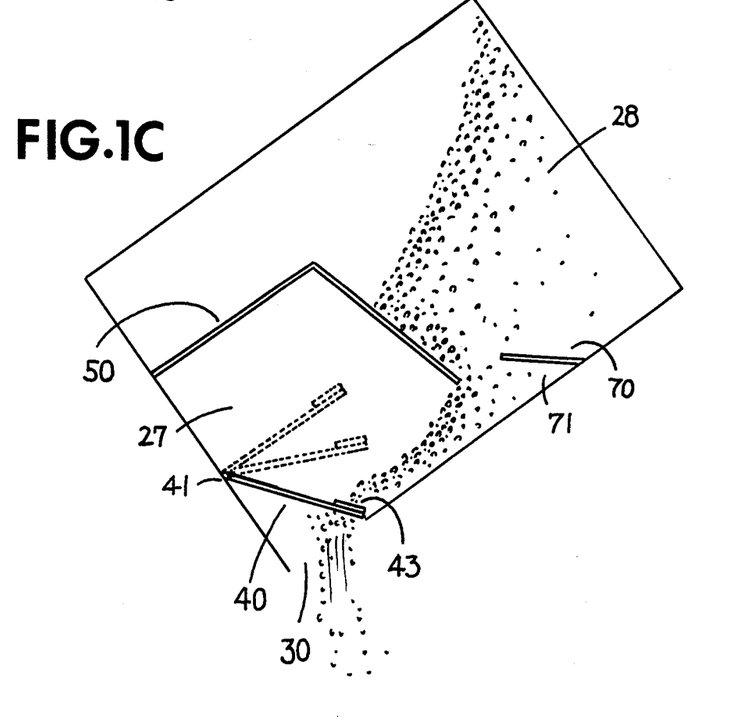
FIG. 1C is a cross-sectional view, the apparatus being shown inverted and the dispensing devices in operative positions.

The control panel 40 is attached to the top wall 18 between the metered dispensing outlet 30 and the guard panel 50. Either the control panel 40 itself or its upper end 41 is made of flexible material so that the control panel 40 can swing freely in the volume control chamber 27. The lower end 43 of the control panel is weighted. When the container 10 is in upright and inoperative position, the control panel 40 is parallel with the upper portion 51 of guard panel 50, side walls 14 and 16, and the dispensing outlet 30 (see FIGS. 1A and 1B). When the container 10 is in tilted position, the upper end 41 of control panel 40 being fixed on the top wall 18, gravity forces the lower end 43 of control panel to move down to seating on the side wall 14 forming a lock position preventing the powder from flowing out of the dispensing outlet 30 (see FIG. 1C). The control panel 40 thus moves down slowly like a time switch. Before the lower end 43 moves to seating against the side wall 14 forming a lock position, the powder flows from the container 10 through the dispensing outlet 30 to the outside of the container 10. The sizes of the outlet 30 can be adjusted by opening or shutting petals 31 and/or 32. The smaller the outlet, the less powder dispensed in each tilting of the container. Conversely, the larger the outlet, the more powder dispensed in each tilting of the container. Thus, by the proper adjustment of the outlet petals 31 and 32, the predetermined volume of powder to be dispensed with each pouring operation can be easily controlled without any changing of parts.

The major purpose of the guard panel 50 is to protect the control panel 40 from bumping directly by the powder of storage chamber 28 when the container 10 is tilted and operating. The slanted lower portion 52 of guard panel 50 permits the unpoured powder in the volume control chamber 27 to fall back into the storage chamber 28 quite rapidly. This feature enables the container 10 to maintain its accuracy even upon rapidly repeated pourings. There is no necessity after each pouring operation to wait for a few moments until the unpoured powder fall back from the volume control chamber 27 into the storage chamber 28.

The starting panel 70 is located at the side wall 14 and lower than guard panel 50 when the container is in upright and inoperative position. The major purpose of starting panel 70 is to provide the powder in storage chamber 28 having a same starting point in each pouring operation despite the amount of powder left. The farther away the powder from the dispensing outlet 30, the longer time for it to move to the dispensing outlet 30. As the distance between the level of powder and the dispensing outlet 30 changes after each pouring, the volume of powder dispensed is different for each pouring operation. The starting panel 70 may improve this problem. The starting panel 70 is attached to the side wall 14 forming a starting chamber 71. After each pouring operation, the unpoured powder will fall back from guard panel 50 and certain amount of powder will remain in starting chamber 71. In next pouring operation, the powder in the starting chamber 71 will move to the dispensing outlet 30 before the powder in the storage chamber 28. As a result, regardless of the level of powder remaining in the storage chamber 28, the container will dispense approximately same amount of powder in each pouring operation.

The free-flow outlet 35 is located at the upper end of side wall 16, opposite to the side wall 14 where the adjustable dispensing outlet 30 is located. The free-flow outlet 35 is to provide a measuring container which can be used as a free-flow container merely by a change in direction for pouring.

For the pouring device to function properly, the speed the control panel swings to the lock position when the container is tilted can not be too fast or too slow . Five alternative embodiments of this invention are presented below, each of which provides a distinct mechanism slowing the speed the control panel swings toward the side wall where the dispensing outlet is located.

Figure 2A:
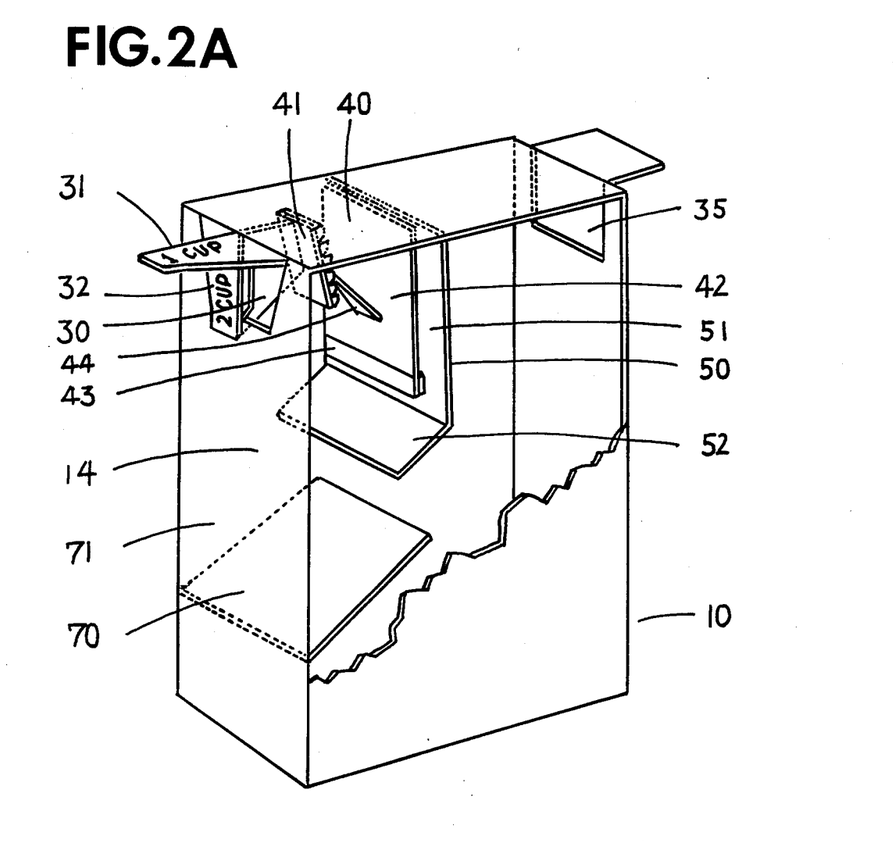
FIG. 2A is a perspective view through the apparatus with various parts in inoperative positions.
Figure 2B:
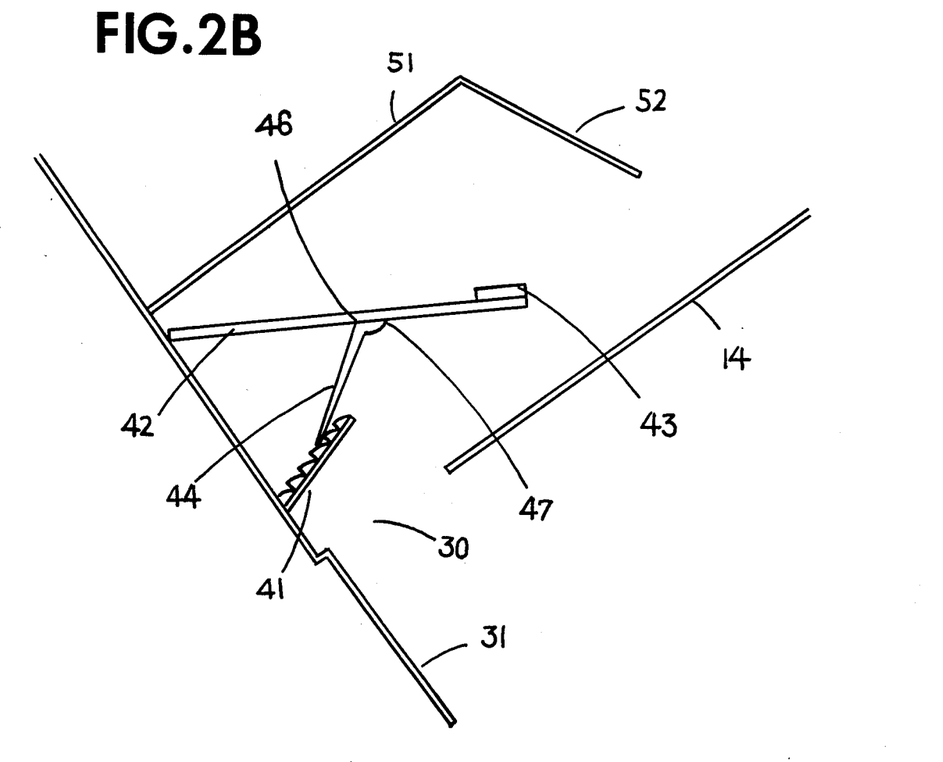
FIG. 2B is an enlarged fragmentary cross-sectional view of the control panel in operative position.
Figure 2C:
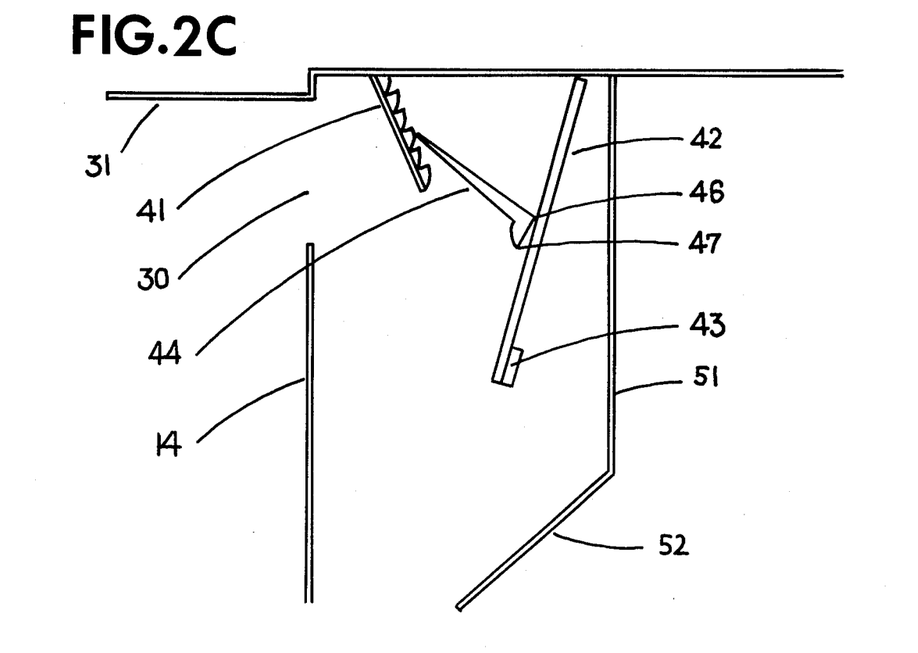
FIG. 2C is an enlarged fragmentary cross-sectional view of the control panel in returning to upright position.

(1) Referring to FIG. 2A, the tooth-face delaying panel 47 is joined at an angle to the top wall 18 between the metered dispensing outlet 30 and the control panel 40. The lower end 43 of the control panel 40 is weighted, and a tentacle 44 is attached at the middle of the control panel 40. As shown in FIG. 2B, when the container 10 is in tilted position, gravity forces the tentacle 44 chafing the tooth-face of the delaying panel 47 and making the lower end 43 of the control panel 40 to move down slowly to seating on the side wall 14 forming a lock position preventing the powder from flowing out of the dispensing outlet 30. FIG. 2C shows the control panel 40 in returning to its inoperative position when the container 10 is placed upright.

Figure 3A:
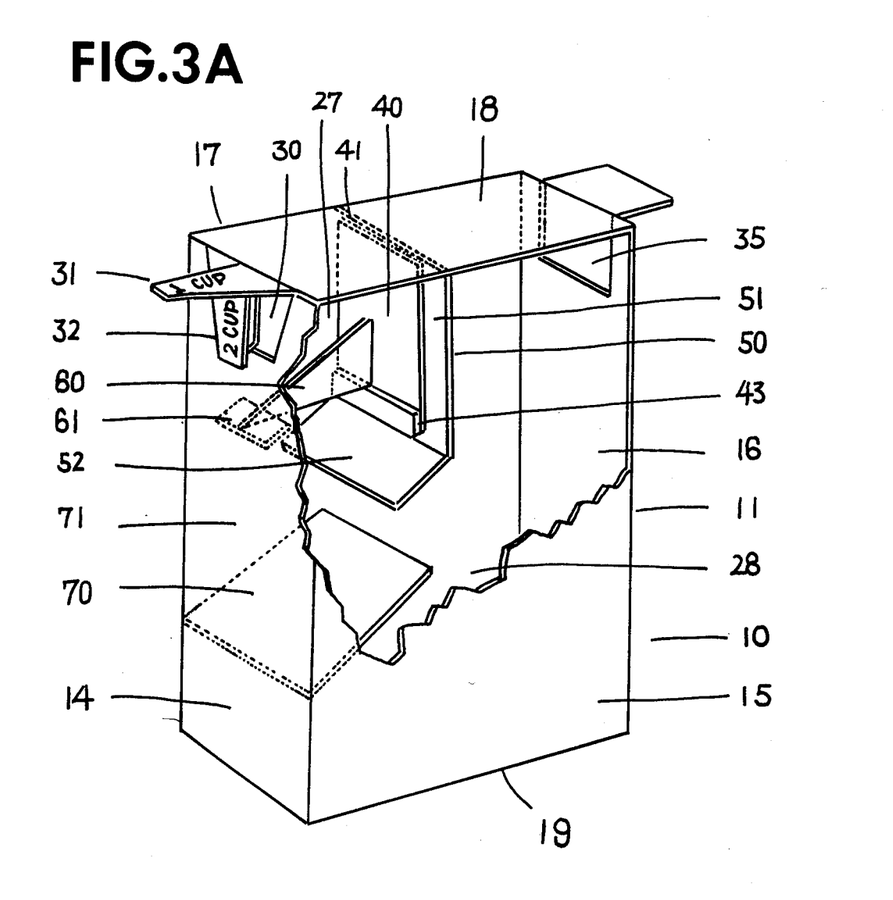
FIG. 3A is a perspective view through the apparatus with the various parts in inoperative positions.
Figure 3B:
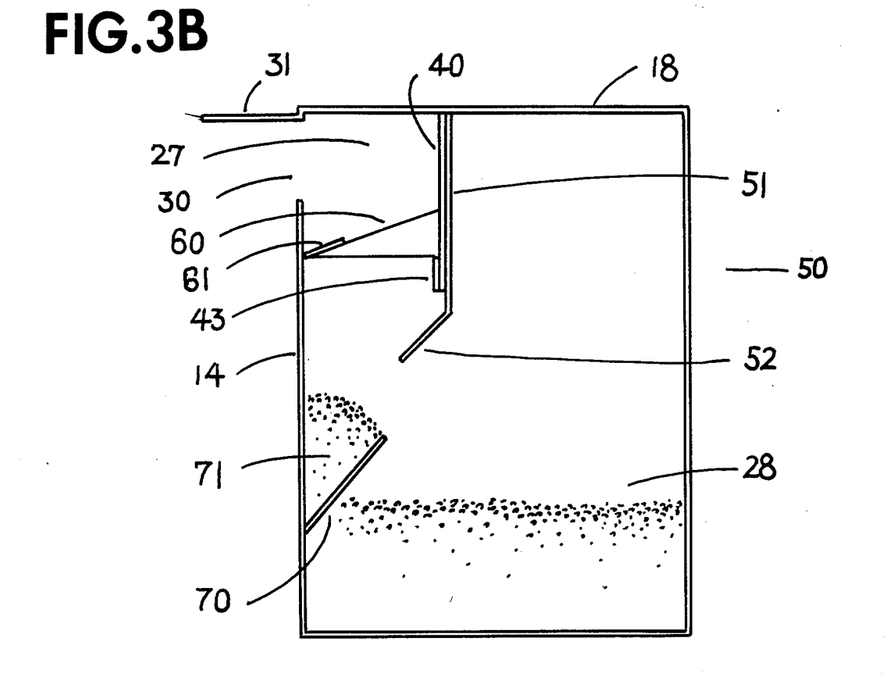
FIG. 3B is a cross-sectional view, the apparatus being shown in the inoperative position.
Figure 3C:
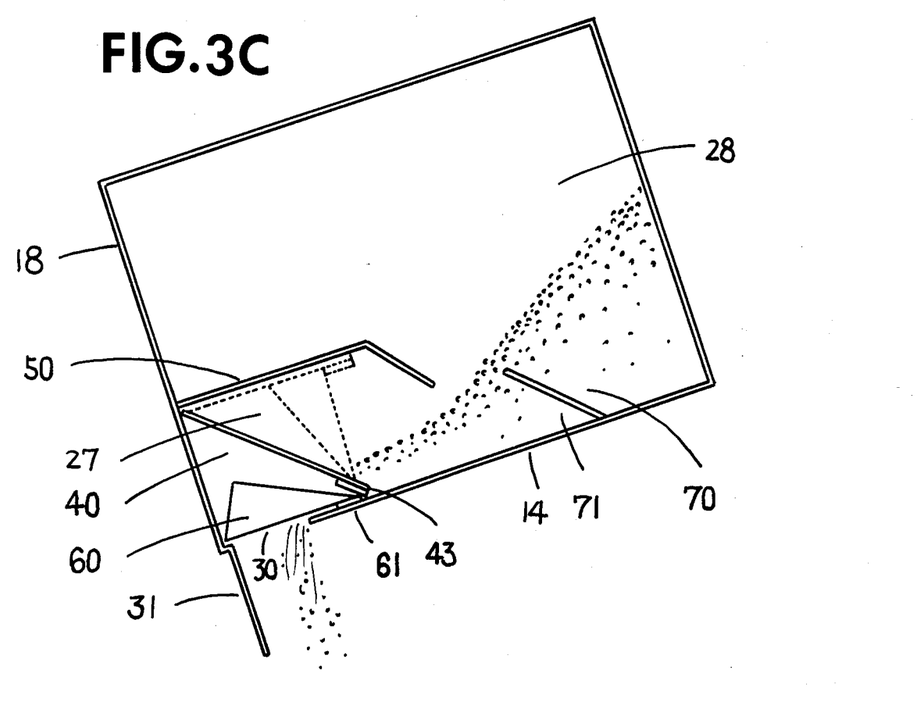
FIG. 3C is a cross-sectional view, the apparatus being shown inverted and the dispensing devices in operative positions.

(2) Referring to FIG. 3A, a triangle supporting panel 60 is hinged at the side wall 14 with a square panel 61 perpendicular to it at the end to stabilize the swinging of the supporting panel 60. The upper portion 52 of the guard panel 50 is arranged with the control panel 40 closely to ensure the supporting panel 60 being laying at the hook shape end 43 of the control panel 40 properly when the container 10 is in upright position (see FIG. 3A and 3B). FIG. 3C shows that when the container 10 is in tilted position, gravity forces the supporting panel 70 to leave the hook shape end 43 of control panel 40 to seating on the side wall 14. Subsequently, the hook shape end 43 of the control panel 40 moves down to seating on the side wall 14 forming a lock position preventing the powder from flowing out of the dispensing outlet 30 (See FIG. 3B). Before the hook shape end 43 moves to seating against the side wall 14 forming a lock position, the powder flows from the starting chamber 71 through the dispensing outlet 30 to the outside of the container 10.

Figure 4A:
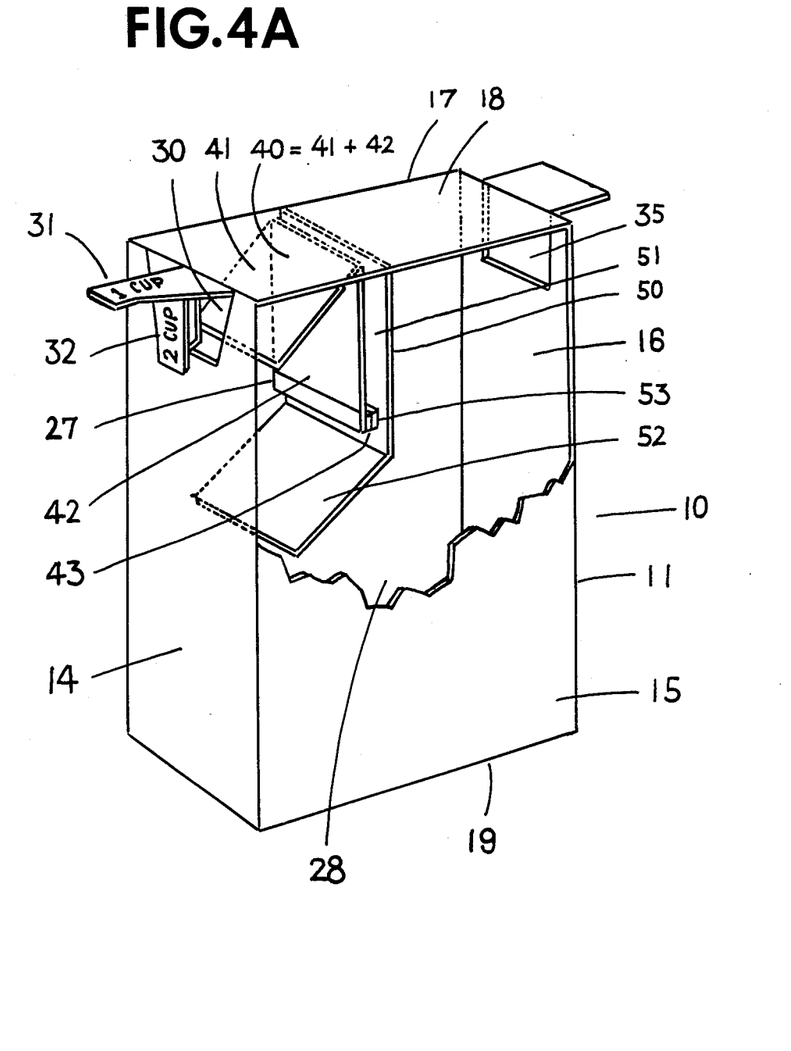
FIG. 4A is a perspective view through the apparatus with the various parts in inoperative positions.
Figure 4B:
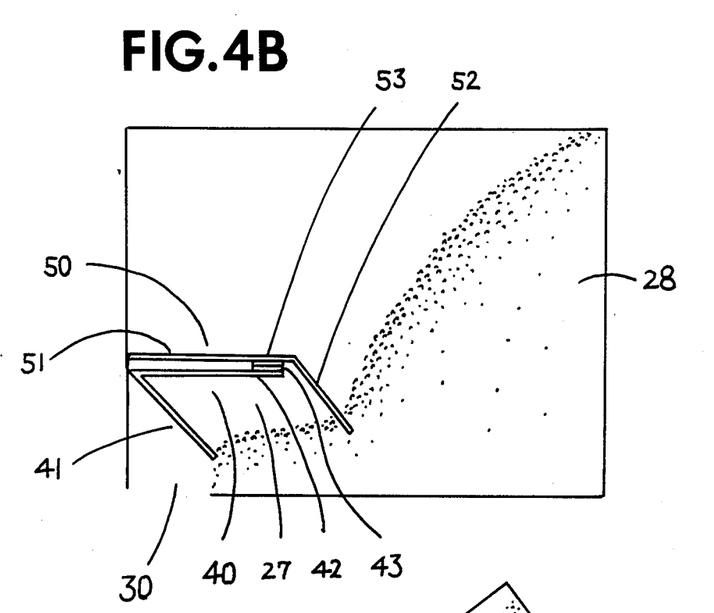
FIG. 4B is a cross-sectional view, the apparatus being shown inverted and the dispensing device in operative position.
Figure 4C:
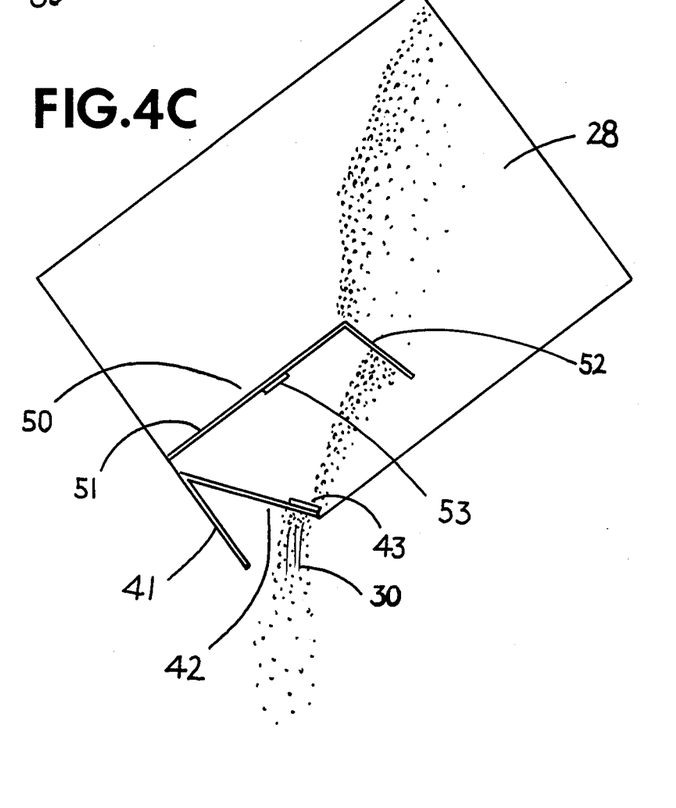
FIG. 4C is a cross-sectional view, the apparatus being shown inverted and the dispensing device in lock position.

(3) Referring to FIG. 4A, the control panel 40 is comprised of two parts: the locking panel 42 and the sensible panel 49. The lower end 43 of the locking panel 42 is magnetic. One end of the sensible panel 49 is joined to the upper end of the locking panel 42 forming a slanted angle. The upper end of the control panel 42 is hinged to the top wall 18 between the dispensing outlet 30 and guard panel 50. The guard panel 50 is comprised of upper portion 51 with a magnetic strip 53 and a slanted lower portion 52. When the container 10 is in upright and inoperative position, the locking panel 42 is parallel with the upper portion 51 of guard panel 50, side walls 14 and 16 and the dispensing outlet 30. The magnetic end 43 and the magnetic strip 53 are magnetized together. As shown in FIG. 4B and 4C, when the container 10 is in tilted position, the powder in the storage chamber 28 is moved to the dispensing outlet 30, forcing the sensible panel 49 and separating the magnetic end 43 and the magnetic strip 53. Gravity forces the magnetic end 43 of the locking panel 42 to move down to seating on the side wall 14 forming a lock position preventing the powder from flowing out of the dispensing outlet 30. It has to be pointed out here that this embodiment does not require the starting panel 70 as described in the above-mentioned embodiments. The function of a starting panel is to minimize the variation in the amount of powder for each pouring due to changing levels of powder in the container. The presence of the sensible panel 49 allows very little powder to flow out of the dispensing outlet 30 before the magnetic end 43 is separated from the magnetic strip 53. Thus, a starting panel is dispensed with in this embodiment.

Figure 5A:
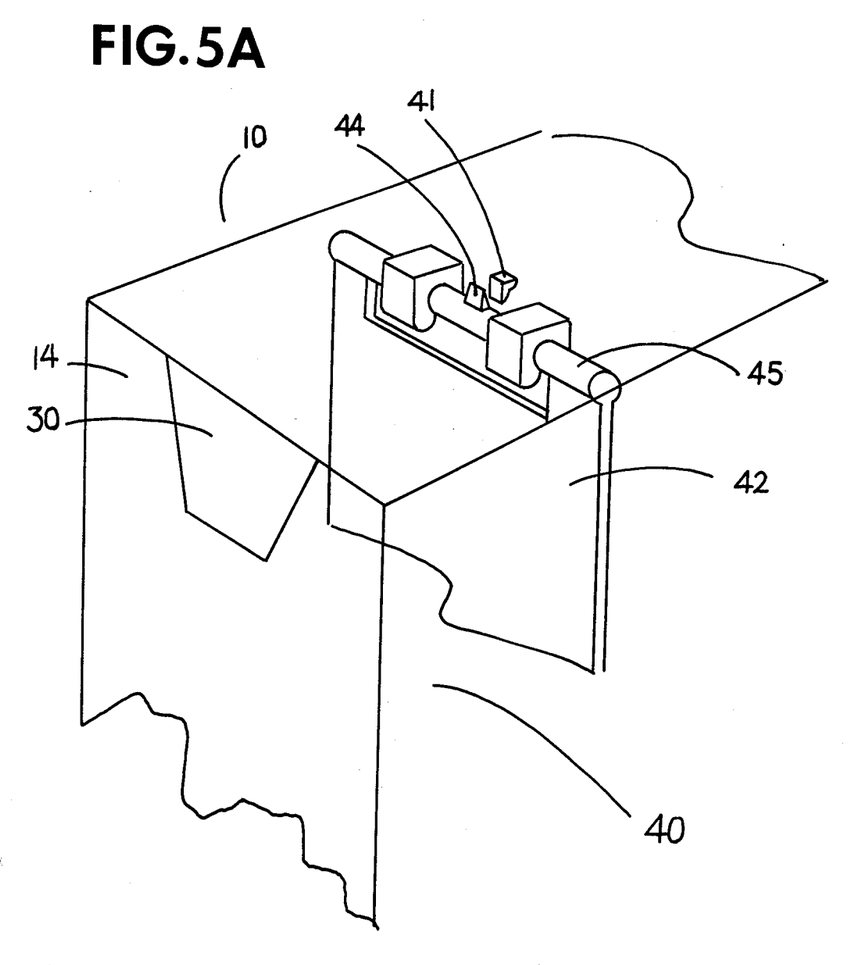
FIG. 5A is an enlarged fragmentary perspective view of the control panel.
Figure 5B:
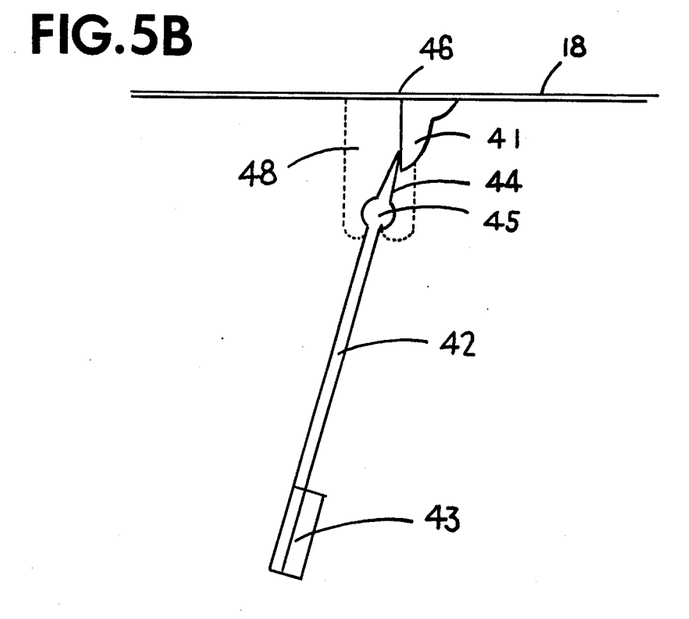
FIG. 5B is an enlarged cross-sectional view of the control panel in operating position.
Figure 5C:
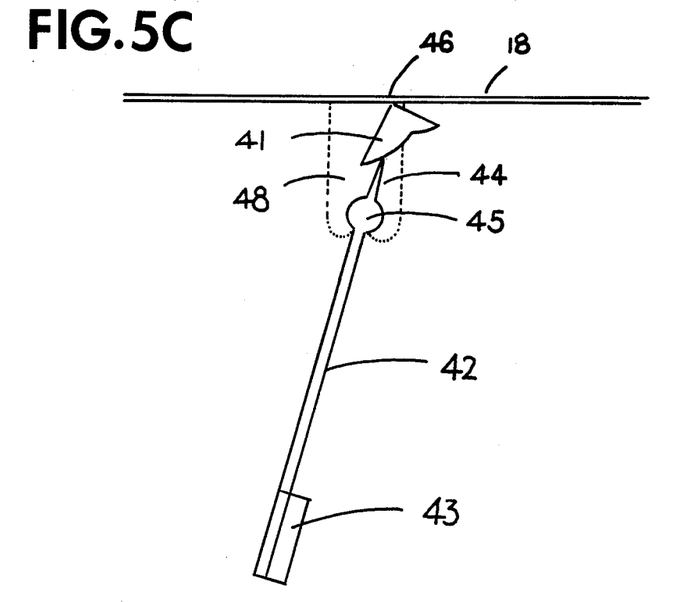
FIG. 5C is an enlarged cross-sectional view of the control panel in returning to upright position.

(4) Referring to FIG. 5A, the upper end 45 of the control panel 40 is hanged to two hinges 48 joined to the top wall 18. The lower end 43 of the control panel 42 is weighted (see FIG. 5B and FIG. 5C). A tentacle 44 is attached at the middle of the upper end 45 of the locking panel 40. The triangle shape delaying block 47 is joined to the top wall 18. When the container 10 is in tilted position, gravity forces the tentacle 44 chafing the triangle delaying block 47 and making the lower end 43 of the control panel 40 to move down slowly to seating on the side wall 14 forming a lock position preventing the powder from flowing out of the dispensing outlet 30 (see FIG. 5B). The delaying block 47 is attached to the top wall 18 with a point 46 so that the delaying block will not be an obstacle when the control panel 40 returns to upright position after pouring (see FIG. 5C).

Figure 6:
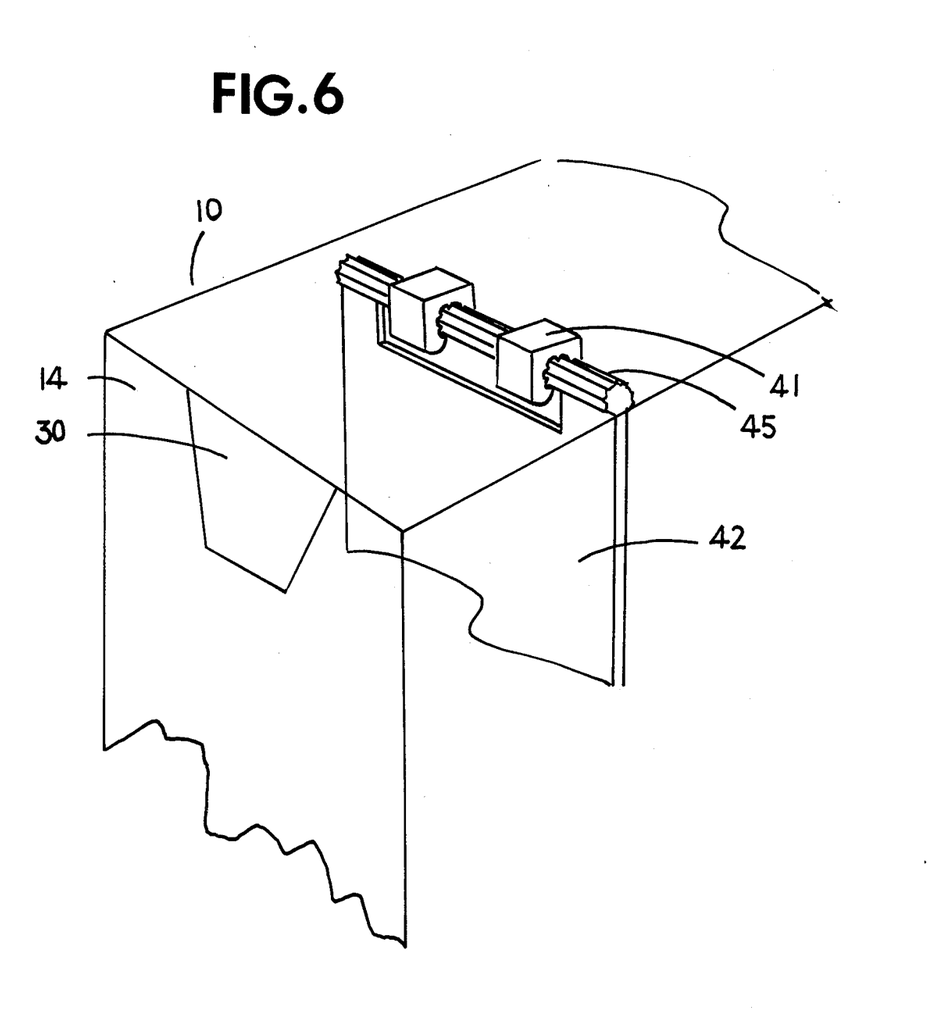
FIG. 6 illustrates a fifth alternative embodiment of this invention. An enlarged fragmentary perspective view of the control panel in this embodiment is shown.

(5) Referring to FIG. 6, the delaying portion 47 is attached to the top wall of the container 10. The upper end 45 of the control panel 40 is hinged to the delaying portion 47. The upper end 45 is of male gear shape and the delaying portion 47 is of female gear shape. When the container 10 is in a tilted position, gravity forces the upper end 45 chafing the delaying portion 47. As a result, the control panel 40 moves down slowly before it completely blocks the material from any further outflow.

The foregoing disclosure and description of the invention are illustrative and explanatory thereof, and various changes in the size, shape and materials, as well as in the details of the illustrated construction may be made without departing from the spirit of the invention.

I claim:

1. A container comprising:
   container housing having four side walls, a top wall and a bottom wall for containing a quantity of powdery or granular materials and adapted to rest in an upright position on a surface;
   a guard panel within said container housing attached to said top wall and dividing the interior into a storage chamber and a volume control chamber with said storage chamber in the lower part when the container is held upright;
   a metered dispensing outlet at an upper portion of the side wall which permits material to dispense from said volume control chamber, but not said storage chamber; and,
   a swinging control panel within said volume control chamber attached to the top wall between said guard panel and said metered dispensing outlet;
   and said control panel being of sufficient length such that when the container is tilted to a dispensing position, the end of said swinging control panel will seat on the side wall at the upper portion thereof, preventing further outflow of material through said metered dispensing outlet.

2. The container as recited in claim 1 further comprising:
   a starting panel attached to the side wall where said metered dispensing outlet is located and in a position below said guard panel when the container is is held upright;
   whereby said starting chamber is formed to hold some of the unpoured material after each pouring operation.

3. The container as recited in claim 1 further comprising:
   a free-flow outlet at the upper portion of the side wall opposite to the side wall where said metered dispensing outlet is located;

whereby the container can be used either as a measuring pourer or as a free-flow pourer at the user's option.

4. The container as recited in claim 1, wherein said guard panel is J-shaped with the upper portion perpendicular to the top wall and the lower portion slanted toward the side wall where said metered dispensing outlet is located.

5. The container as recited in claim 1, wherein said metered dispensing outlet contains two or more outlet petals for adjusting the opening size of the outlet.

6. The container as recited in claim 1, wherein said swinging control panel has a weighted lower end.

7. The container as recited in claim 1, wherein said swinging control panel is made of flexible material or is attached to the top wall through flexible material so that it can move toward or away from the side wall where said metered dispensing outlet is located upon inducement of gravity.

8. The container as recited in claim 1, wherein said swinging control panel is pivotally mounted in two hinges attached to the top wall so that it can move toward or away from the side wall where said metered dispensing outlet is located upon inducement of gravity.

9. The container as recited in claim 1 further comprising:
   an upward tentacle attached at the middle of said swinging control panel; and,
   a tooth-face delaying panel attached to the top wall between said metered dispensing outlet and said swinging control panel with the tooth-face facing said tentacle;
whereby said tentacle chafes the tooth-face of said delaying panel when said swinging control panel moves toward or away from the side wall where said metered dispensing outlet is located upon inducement of gravity.

10. The container as recited in claim 1 further comprising:
   a triangle supporting panel hinged at the side wall where said metered dispensing outlet is located; and,
   a hook-shaped block attached to the end of said swinging control panel facing the side wall where said metered dispensing outlet is located;
whereby said triangle supporting panel seats on said hook-shaped block when the container is in an upright position and moves toward or away from the side wall where said metered dispensing outlet is located upon inducement of gravity.

11. The triangle supporting panel recited in claim 10 further comprising a square panel perpendicular to it as to stabilize its movement upon inducement of gravity.

12. The container recited in claim 1, wherein said panel guard has a magnetic strip on the upper portion facing the side wall where said metered dispensing outlet is located, and wherein said swinging control panel is comprised of two parts:
   a locking panel perpendicular to the top wall when the container is in an upright position and with a magnetic end facing said magnetic strip; and,
   a sensible panel joined to the upper end of said locking panel forming a slanted angle;
whereby said magnetic strip and magnetic end are magnetized together when the container is in an upright position and separated when the container is in an pouring position due to material falling on said sensible panel.

13. The container as recited in claim 8 further comprising:
   an upward tentacle attached at the middle of the upper end of said swinging control panel; and,
   a delaying block joined to the top wall between the guard panel and said hinges;
whereby said tentacle chafes said delaying block when said swinging control panel moves toward or away from the side wall where said metered dispensing outlet is located upon inducement of gravity.

14. The container as recited in claim 8 wherein the pivot portion of said swinging control panel is of male gear shape and bearing portion of said hinges is of female gear shape.

* * * * *